(12) United States Patent
Linde et al.

(10) Patent No.: US 8,337,687 B2
(45) Date of Patent: Dec. 25, 2012

(54) STRUCTURED CHROME SOLID PARTICLE LAYER AND METHOD FOR THE PRODUCTION THEREOF

(75) Inventors: Rudolf Linde, Wermelskirchen (DE); Stefan Duerdoth, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 12/936,158

(22) PCT Filed: Jan. 22, 2009

(86) PCT No.: PCT/EP2009/000384
§ 371 (c)(1),
(2), (4) Date: Dec. 21, 2010

(87) PCT Pub. No.: WO2009/121443
PCT Pub. Date: Oct. 8, 2009

(65) Prior Publication Data
US 2011/0115167 A1 May 19, 2011

(30) Foreign Application Priority Data
Apr. 4, 2008 (DE) .......................... 10 2008 017 270

(51) Int. Cl.
*C25D 7/00* (2006.01)
*C25D 5/18* (2006.01)
(52) U.S. Cl. .......... 205/50; 148/423; 205/109; 205/113; 426/665; 426/687; 426/935
(58) Field of Classification Search .................. 148/423; 205/109, 113, 50; 428/666, 687, 935
See application file for complete search history.

(56) References Cited

U.S. PATENT DOCUMENTS
3,139,393 A 6/1964 Passal et al.
(Continued)

FOREIGN PATENT DOCUMENTS
CA 2172613 4/1995
(Continued)

OTHER PUBLICATIONS
English Machine Translation of DE 4432512. Printed from EPO website on Feb. 15, 2008. pp. 1-2.
(Continued)

*Primary Examiner* — Stanley Silverman
*Assistant Examiner* — Brain Walck
(74) *Attorney, Agent, or Firm* — Patterson Thuente Christensen Pedersen, P.A.

(57) ABSTRACT

A structured chromium solids particles layer with a network of cracks in which solids particles are embedded, wherein the crack density is 10-250 per mm, the particle size of the solids particles lies in the range of from 0.01-10 μm, the proportion of solids particles in the overall layer is 1-30 vol.-% and the chromium solids particles layer has a microstructure with depressions in the surface of the layer, wherein the proportion of the surface area accounted for by the depressions is 5-80%. A method for producing the structured chromium solids particles layer on a workpiece includes introducing the workpiece into an electrolyte containing a Cr(VI) compound and electrolytically depositing a chromium layer at a current density of 20-100 A/dm$^2$ and a current yield of 12% or less and then reversing the current direction wherein the solid particles are embedded within the network of cracks.

20 Claims, 5 Drawing Sheets

U.S. PATENT DOCUMENTS

| | | | |
|---|---|---|---|
| 3,901,659 A | 8/1975 | Jokik et al. | |
| 3,920,527 A | 11/1975 | Dettke et al. | |
| 3,951,759 A | 4/1976 | Studer | |
| 4,468,293 A | 8/1984 | Polan et al. | |
| 4,588,481 A | 5/1986 | Chessin et al. | |
| 4,590,239 A | 5/1986 | Sugio et al. | |
| 4,846,940 A | 7/1989 | Neuhauser et al. | |
| 5,196,108 A | 3/1993 | Wilmeth et al. | |
| 5,415,761 A | 5/1995 | Mull | |
| 5,415,763 A | 5/1995 | Johnson et al. | |
| 6,319,385 B1 | 11/2001 | Mull | |
| 6,329,071 B1 | 12/2001 | Kobayashi et al. | |
| 6,355,366 B1 | 3/2002 | Santini | |
| 6,447,666 B1 | 9/2002 | Szameitat | |
| 6,478,943 B1 | 11/2002 | Lasia et al. | |
| 6,503,642 B1 | 1/2003 | Linde | |
| 6,562,216 B2 | 5/2003 | Schlenkert et al. | |
| 6,837,981 B2 | 1/2005 | Horsthemke | |
| 7,699,970 B2 | 4/2010 | Linde et al. | |
| 2003/0121794 A1 | 7/2003 | Horsthemke | |
| 2006/0040124 A1* | 2/2006 | Oshimi et al. | 428/548 |
| 2006/0054509 A1 | 3/2006 | Linde et al. | |
| 2007/0131558 A1 | 6/2007 | Horsthemke et al. | |
| 2008/0060945 A1 | 3/2008 | Linde et al. | |
| 2010/0112376 A1 | 5/2010 | Linde et al. | |

FOREIGN PATENT DOCUMENTS

| | | |
|---|---|---|
| CS | 214553 | 5/1982 |
| DE | 3307748 | 9/1983 |
| DE | 35 31 410 A1 | 3/1987 |
| DE | 4211881 | 10/1993 |
| DE | 4334122 | 4/1995 |
| DE | 4432512 | 3/1996 |
| DE | 19828545 | 8/1999 |
| DE | 102 55 853 A1 | 6/2004 |
| DE | 10 2004 019 370 B3 | 9/2005 |
| EP | 0196053 | 10/1986 |
| EP | 0 217 126 A1 | 4/1987 |
| EP | 0 668 375 A1 | 8/1995 |
| EP | 0 841 413 A1 | 5/1998 |
| EP | 1 114 209 B1 | 7/2001 |
| EP | 1205582 | 5/2002 |
| EP | 1 719 827 A1 | 11/2006 |
| EP | 1 798 313 A2 | 6/2007 |
| FR | 2 558 852 | 8/1985 |
| GB | 2 153 387 A | 8/1985 |
| GB | 2153387 | 8/1985 |
| WO | WO 01/04386 A1 | 1/2001 |
| WO | WO02/38835 | 5/2002 |
| WO | WO2004/050960 | 6/2004 |
| WO | WO 2004/050960 A1 | 6/2004 |
| WO | WO 2005/108648 A2 | 11/2005 |

OTHER PUBLICATIONS

Gardam, "The Production of Machinable Cr Depostits", J. of the Electrodepositors' Technical Soc (No month, 1945. vol. 20. pp. 69-74. Abstract Only.

Application and File History for U.S. Appl. No. 10/536,665 filed May 27, 2005, inventors Linde et al.

Application and File History for U.S. Appl. No. 12/683,890 filed Jan. 7, 2010, inventors Linde et al.

Application and File History for U.S. Appl. No. 11/587,117 filed Oct. 20, 2006, inventors Linde et al.

* cited by examiner

Load-bearing portion of the surface        Depression

Depression         Load-bearing portion of the surface

Depression    Load-bearing portion of the surface

STRUCTURED CHROME SOLID PARTICLE LAYER AND METHOD FOR THE PRODUCTION THEREOF

PRIORITY CLAIM

The present application is a National Phase entry of PCT Application No. PCT/EP2009/000384, filed Jan. 22, 2009, which claims priority from German Application Number 102008017270.7, filed Apr. 4, 2008, the disclosures of which are hereby incorporated by reference herein in their entirety.

FIELD OF THE INVENTION

The invention relates to a structured chromium solids particles layer which has a microstructure and a network of cracks, wherein solids particles are embedded in the network of cracks. The invention also relates to a method for the production of this structured chromium solids particles layer and a machine element which is coated with the structured chromium solids particles layer.

BACKGROUND OF THE INVENTION

Machine elements which are exposed to friction and high temperatures, for example piston rings, must have surfaces which are corrosion-resistant, wear- and seizure-resistant as well as scorch-resistant and must also have good sliding properties. For this the machine elements, in particular their contact surfaces, can be covered with wear-protection layers in the form of electrolytically deposited hard chromium layers.

To improve wear and seizure resistance, solids particles can be embedded in electroplated hard chromium layers. Electroplated hard chromium layers which have a network of cracks and in the cracks of which solids particles are embedded are described in DE 3531410 A1 and EP 0217126 A1. Particularly advantageous properties can be achieved by diamond particles with a size from 0.25-0.4 µm, embedded in the cracks of such an electrolytically deposited hard chromium layer, as described in WO 2001/004386 A1 and EP 1114209 B1.

Electroplated hard chromium layers can also be provided with a microstructure. Structured electroplated hard chromium layers which have particularly good tribological properties are known from DE 10255853 A1, WO 2004/050960 A1, DE 102004019370 A1 and WO 2005/108648 A2. A hard chromium layer the structure of which is cup-shaped and/or labyrinthine and/or columnar can be obtained according to this prior art through the composition of the electrolyte used during production and the low current yield of below 12% as specific method measures. This cup-shaped and/or labyrinthine and/or columnar surface structure provides outstanding sliding properties and very good emergency running properties, as the surface structure is characterized by good lubricant-retention capacity.

In order to combine the high wear-, seizure- and scorch resistances of the above-named chromium solids particles layer with the good tribological properties of a structured hard chromium layer, a chromium solids particles layer can be applied to the above-described hard chromium layer and a double layer thus produced. In this way the advantageous cup-shaped and/or labyrinthine and/or columnar structure of the structured hard chromium layer can be transferred to the chromium solids particles layer, even more wear-resistant in comparison with the structured hard chromium layer, i.e. continued by the chromium solids particles layer, and thus the very high wear resistance of the chromium solids particles layer can be combined with the tribological advantages of the structured hard chromium layer.

However, a disadvantage of this type of double coating is that the electrolytic deposition process is laborious and expensive because of the need to change the deposition conditions and electrolyte, an overall relatively thick coating must be applied to the machine element and the structure of the top chromium solids particles layer is frequently no longer as pronounced as in the previously applied structured hard chromium layer. Furthermore, double coating brings with it the risk that, with machine elements rubbing after prolonged running times, for example long engine running times of correspondingly coated piston rings, the upper layer is eroded and then the structured hard chromium layer lying below, which is particle-free, leads to increased wear and scorching.

Thus far it has not been possible to embed particles in a thus-structured chromium layer because crack-forming method measures for embedding particles could not be combined in a single process with structure-generating method measures.

SUMMARY OF THE INVENTION

Therefore, an object of the present invention is to overcome the above-mentioned disadvantages of the prior art and to provide an electroplated hard chromium layer which is highly wear-resistant and scorch-resistant and simultaneously has good tribological properties as well as outstanding emergency running properties. Furthermore, the object of the present invention is to provide a method for the production of such an electroplated hard chromium layer.

According to the invention this object is achieved by a structured chromium solids particles layer with a network of cracks in which solids particles are embedded, wherein the crack density is 10-250/mm, the particle size of the solids particles lies in the range of from 0.01-10 µm, the proportion of solids particles in the overall layer is 1-30 vol.-% and the chromium solids particles layer has a microstructure with depressions in the surface of the layer, wherein the proportion of the surface area accounted for by the depressions is 5-80%.

The object is further achieved by a method for the production of a structured chromium solids particles layer, comprising the steps that (a) a machine element is introduced into an electrolyte which contains a Cr(VI) compound in a quantity which corresponds to 100 g/l-400 g/l chromic anhydride, 1-8 g/l sulphuric acid, 5-18 g/l aliphatic sulphonic acid with 1-6 carbon atoms, solids particles with a size from 0.01-10 µm and less than 0.5 g/l inorganic fluoride compounds, (b) a chromium-containing layer is electrolytically deposited on the machine element at a current density of 20-100 A/dm$^2$ and a current yield of 12% or less, then (c) the current direction is reversed, wherein the solids particles embed themselves in microcracks of the layer, and steps (b) and (c) are optionally repeated.

It is surprisingly possible with this method to embed solids particles in a chromium-containing layer and simultaneously to produce a microstructure of this layer, whereby the obtained layer has outstanding wear properties, very high scorch resistance values and simultaneously outstanding tribological properties as well as emergency running properties.

BRIEF DESCRIPTION OF THE DRAWINGS

The present invention may be more completely understood in consideration of the following detailed description of various embodiments of the invention in connection with the accompanying drawings, in which.

DETAILED DESCRIPTION OF THE DRAWINGS

Figure 1:
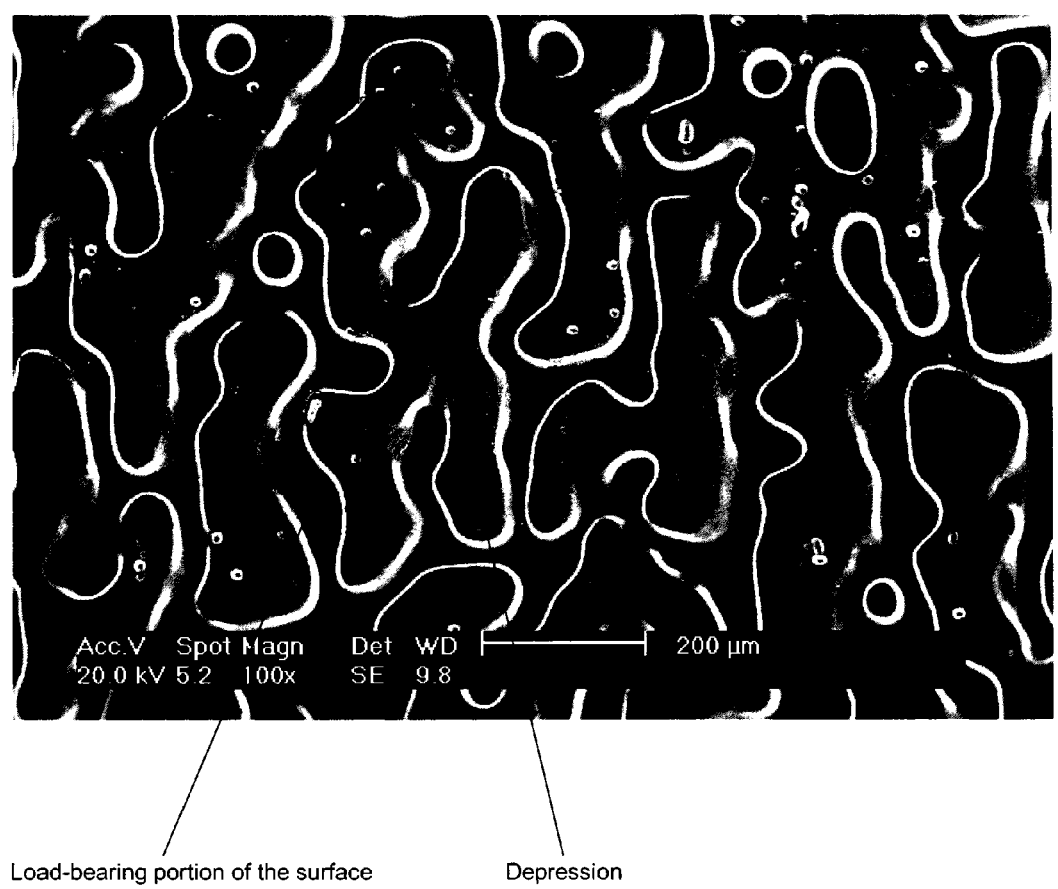
FIGS. 1-3 show scanning electron microscopy photographs of the structured chromium solids particles layers according to the invention.

By machine elements are meant within the meaning of the invention machine elements of any type which are to be provided with a structured chromium solids particles layer. They can be metallic or non-metallic machine elements. If a structured chromium solids particles layer is to be formed on a non-metallic item, this will firstly be made electrically conductive by the application of a thin metal film. The coating according to the invention can be used to coat a large number of machine elements, in particular for coating machine parts which are exposed to mechanical wear, in particular friction wear, for example piston rings, cylinders, pistons, pins, camshafts, seals, composite materials, valves, bearings, pressure cylinders and embossing rolls. Piston rings, cylinders and pistons for combustion engines, in particular piston rings, are preferred machine elements.

To form the structured chromium solids particles layer, the machine element is introduced into the electrolyte and cathodically connected. A direct current or a pulsating direct current, for example a pulsating direct current with a frequency of up to 10 kHz, is applied to the machine element. According to the invention a network of cracks and a microstructure of the layer forms in deposition step (b). In the polarity-reversal step (c) the workpiece is anodically connected and the microcracks widen with the result that the solids particles embed themselves in the microcracks. The solids particles are preferably kept suspended in the electrolyte. This can be achieved by matching the density of the electrolyte to the density of the solids particles. Furthermore, surfactants can be added to the electrolyte. The electrolyte preferably does not contain surfactants. The microstructure of the surface is preserved in spite of the polarity-reversal step and the coating combines the advantageous properties of a structured hard chromium layer with those of a solids-containing chromium layer. When steps (b) and (c) are repeated, the cracks are sealed in the subsequent deposition step and a further layer of a microcracked chromium layer is deposited, the cracks of which are again widened and filled with particles.

By "electrolyte" is meant within the meaning of the present invention aqueous solutions the electrical conductivity of which results from electrolytic dissociation of electrolyte constituents into ions. Consequently, in addition to the above-named components and optionally further additives present, the electrolyte has water as the remainder.

The above-mentioned quantities of the individual components of the electrolyte refer to the electrolyte. According to the invention a Cr(VI) compound is used. Unlike chromium layers formed from trivalent Cr electrolytes, electrolytic chromium layers deposited from Cr(VI) compounds have more lattice defects as, in addition to cubically body-centred chromium, chromium formed from a hexavalent chromium electrolyte contains a larger proportion of hexagonal chromium hydride which is attributable to the formation of hydrogen during electroplating. This leads to a larger number and density of lattice defects and thus also to a greater hardness of the deposited chromium. A low current yield reinforces this effect. $CrO_3$, which has proved particularly favorable for the electrolytic deposition of chromium, is preferably used as Cr(VI) compound.

The electrolyte preferably contains a Cr(VI) compound in a quantity which corresponds to 150 g/l-300 g/l chromic anhydride. It is further preferred if the electrolyte contains 2-6 g/l sulphuric acid. The electrolyte preferably contains a quantity of 6-16 g/l aliphatic sulphonic acid with 1-6 carbon atoms. Aliphatic sulphonic acids with 1-4 carbon atoms are preferred, and among these methane sulphonic acid, ethane sulphonic acid, methane disulphonic acid and/or ethane disulphonic acid are particularly preferred. Methane sulphonic acid is most preferred.

The electrolyte according to the invention contains less than 0.5 g/l (grams per liter) inorganic fluoride compounds, as these disrupt the formation of the structure of the layer according to the invention. By inorganic fluoride compounds are meant within the meaning of the invention fluoride compounds which can be partially or completely dissociated into simple fluoride ions ($F^-$) or complex fluoride ions (e.g. $HF_2^-$, $BF_4^-$, $SiF_6^{2-}$ etc.), in aqueous media, in particular fluoride salts and fluoride-containing inorganic acids such as e.g. HF, $HBF_4$, $H_2SiF_6$ and their salts, e.g. $M^IF$, $M^IBF_4$, $M^I_2SiF_6$, $M^{II}F_2$, $M^{II}(BF_4)_2$, $M^{II}SiF_6$, in which $M^I$ stands for alkali ions ($Li^+$, $Na^+$, $K^+$, $Rb^+$, $Cs^+$) and $M^{II}$ for alkaline-earth ions ($Be^{2+}$, $Mg^{2+}$, $Ca^{2+}$, $Sr^{2+}$, $Ba^{2+}$). The electrolyte preferably contains less than 0.25 g/l inorganic fluoride compounds, particularly preferably less than 0.1 g/l and most preferably less than 0.05 g/l inorganic fluoride compounds.

The electrolyte can also contain customary electrolysis aids and catalysts which support chromium deposition. These may be present in the electrolyte in customary quantities.

The current density in deposition step (b) is 20-100 A/dm$^2$, preferably 30-80 A/dm$^2$. The higher the chosen current density, the denser becomes the structure, i.e. the denser the depressions of the structured chromium solids particles layer become and the more space they occupy. Operations during polarity-reversal step (c) are preferably at a current density of 5-100 A/dm$^2$, particularly preferably at a current density of 20-80 A/dm$^2$. During the method the temperature can be 45-95° C., preferably 50-90° C., particularly preferably 60-80° C.

The deposition duration is chosen depending on the desired thickness of the structured chromium solids particles layer, wherein the higher the current density and the current yield, the longer the deposition lasts and the more frequently steps (b) and (c) are repeated, the thicker the layer becomes. Deposition step (b) is preferably carried out for 5-240 minutes. Polarity-reversing step (c) is advantageously carried out for 5-600 s (seconds), depending on the current density in step (c) and the desired widening of the cracks. The polarity-reversing step is preferably carried out for 10-300 s, particularly preferably 30-90 s.

A further important method parameter is the current yield. During an electrolytic deposition, as a rule only some of the current quantity used goes into metal deposition, the rest of the current quantity leads to losses, wherein primarily hydrogen is produced. By cathodic current yield, also called degree of efficiency, is meant the ratio of the current quantity leading to metal deposition to the total current quantity used. If, for example 100 Ah is used, of which 25 Ah leads to metal deposition and 75 Ah is present as losses, the cathodic current yield is 25%.

The current yield is as a rule optimized in the prior art towards as high a current yield as possible in order to achieve a high degree of efficiency. In the prior art the current yield during the deposition of electrolytic chromium layers is usually above approximately 15%, frequently even above 20%. On the contrary, a lower current yield has proved necessary for the structure formation of the layer according to the present invention with the cathodic current yield being 12% or less and preferably 8-12%. If the current yield is higher, the desired structure of the hard chromium layer is not obtained.

The chromium solids particles layer itself can consist of several layers which are applied successively by repeating deposition step (b) and polarity-reversal step (c). If several layers are applied and particles are in each case introduced into the cracks of the individual layers, a coating can be obtained which has a better distribution of the solids particles in the coating both in its total thickness and also over its surface, as the cracks are not always formed at the same points.

In order to achieve as uniform as possible a distribution of the cracks and thus of the solids particles in the layer according to the invention, steps (b) and (c) are therefore repeated, wherein depending on the intended use and the thickness of the desired structured chromium solids particles layer 1-100 repetitions, i.e. 2-101 cycles of steps (b) and (c) have proved favorable. Depending on the intended use, the whole of the structured chromium solids particles layer has a layer thickness of approximately 20-800 µm. Layer thicknesses of 30-500 µm are preferred, 50-300 µm particularly preferred.

In a preferred embodiment, the method concludes with a step of electrolyte deposition of chromium in order to re-seal the microcracks widened in the last polarity-reversal step (c) and filled with solids particles and thus fix the solids particles. It is particularly preferred that, at the end of the method after step (c), step (b) is also repeated. This method for the production of a structured chromium solids particles layer therefore comprises the steps that (a) a machine element is introduced into an electrolyte which contains a Cr(VI) compound in a quantity which corresponds to 100 g/l-400 g/l chromic anhydride, 1-8 g/l sulphuric acid, 5-18 g/l aliphatic sulphonic acid with 1-6 carbon atoms, solids particles with a size from 0.01-10 µm and less than 0.5 g/l inorganic fluoride compounds, (b) a chromium-containing layer is electrolytically deposited on the machine element at a current density of 20-100 A/dm$^2$ and a current yield of 12% or less, then (c) the current direction is reversed, wherein the solids particles embed themselves in microcracks of the layer, steps (b) and (c) are optionally repeated, and then step (b) is repeated.

As described above, the workpiece to be chromium-plated is cathodically connected during electrolysis. Hydrogen is formed at the cathode in the deposition step (b), metal deposition takes place and Cr(VI) is reduced to Cr(III). Oxygen forms again at the anode, and an oxidation of Cr(III) to Cr(VI) takes place. This oxidation of Cr(III) to Cr(VI) takes place in particular at a $PbO_2$ surface layer of the anode and a specific Cr(III)/Cr(VI) ratio forms which depends on a series of parameters of the method, in particular on the composition and concentration of the electrolyte, the current density and the surface area ratio of anode to cathode (workpiece). For example, with otherwise unchanged conditions, an anode with a greater surface area can lead to a smaller Cr(III) content. The chromium-plating electrolyte is as a rule used several times. In order to have a specific Cr(III) content available immediately at the beginning of the method with a freshly-prepared electrolyte, a reductant, for example saccharose, can be added to the electrolyte.

It has proved particularly favorable for a quick and uniform deposition of the structured chromium solids particles layer on the workpiece if the electrolyte contains Cr(III) in a quantity which corresponds to 4-16 g/l $Cr_2O_3$. Additionally, the process is thus more stable overall. The electrolyte particularly preferably contains Cr(III) in a quantity which corresponds to 8-12 g/l $Cr_2O_3$.

To achieve a high wear resistance, hard material particles are preferably used as solids particles. By hard material particles are meant within the meaning of the invention particles of materials which have a Mohs' hardness of 9 or higher. Among these, hard material particles with a Mohs' hardness of 9.2-10 are preferred, and those with a Mohs' hardness of 9.4-10 particularly preferred. The Mohs' hardness is determined according to the Mohs' hardness test known in the prior art.

Preferred hard material particles are those comprising tungsten carbide, chromium carbide, aluminum oxide, silicon carbide, silicon nitride, boron carbide, cubic boron nitride and/or diamond.

The quantity of solids particles which is contained in the electrolyte can be varied within wide ranges. It has proved advantageous that 0.1-200 g/l solids particles are contained in the electrolyte. Particularly preferably, 0.5-50 g/l solids particles and most preferably, 1-20 g/l solids particles are contained in the electrolyte.

The particle size of the solids particles lies in the range of from 0.01 to 10 µm, preferably in the range of from 0.01-8 µm. Solids particles with a particle size in the range of from 0.1-5 µm are particularly preferred, and the particle size is most preferably 0.25-2 µm. Preferably above 90%, particularly preferably above 95%, of the solids particles contained in the electrolyte lie within the above-named limits.

The gap width of the cracks produced in step (c) of the method should be greater than the particle size and lies preferably above 0.02 µm, particularly preferably above 0.05 µm and most preferably above 0.1 µm.

It is particularly preferred to use diamonds, aluminum oxide and/or silicon nitride particles as solids particles. The preferred size of diamond particles is 0.25-0.45 µm. The preferred size of aluminum oxide and silicon nitride particles is 0.1-5 µm.

Embedded diamond particles have the advantage that at high thermal load stresses such as for example may occur with piston rings they lead to particularly good sliding properties. Diamond changes into graphite at higher temperatures and, when high pressures and inadequate lubrication coincide, the temperature for example of the contact surface of the piston ring can become so high that scorching occurs. Under these conditions, the diamond particles then advantageously change into graphite which then takes over lubrication tasks and thus prevents scorching. In addition to the good emergency running properties in the case of inadequate lubrication, which is attributable to the microstructure, in this way additional emergency running properties are achieved at high temperatures of approximately 700° C. or higher.

Embedded diamond particles can be formed from mono- and/or polycrystalline diamond. The better results are frequently achieved with polycrystalline diamond as, because of the many different crystals, a polycrystalline diamond has many sliding planes. Mixtures of solids particles or hard material particles of different types and/or size can also be used as solids particles or hard material particles.

Furthermore, the cracks of the chromium solids particles layer may contain solid lubricant particles, solids particles to increase ductility and/or corrosion stability. By embedding further particles in addition to the solids materials particles, the layer can be further adapted for the respective application. Thus for example hexagonal boron nitride, graphite and/or polymer particles, in particular of polyethylene and/or polytetrafluoroethylene, can additionally be introduced into the cracks as solid lubricant particles. Ductile metals or metal alloys of tin, titanium or aluminum can be embedded to increase the ductility.

By a structured chromium solids particles layer are meant within the meaning of the present invention not only layers of pure chromium and solids particles, but also layers of chromium alloys, in particular with molybdenum, vanadium and zirconium. The present invention thus also relates to structured chromium alloy solids particles layers. If the structured chromium solids particles layer is to be formed, not from pure chromium, but from an alloy, the alloy elements are dissolved as salts in the chromium-plating electrolyte and electroplated together with the chromium in the form of a chromium alloy. The alloy elements are present in the chromium layer preferably in quantities of 0.1-30 wt.-% (weight percent), particularly preferably 0.5-15 wt.-%. Such layers are frequently more wear-resistant compared with pure chromium layers.

In a preferred embodiment, to produce chromium/molybdenum, chromium/vanadium and/or chromium/zirconium alloy layers which contain solids particles and are structured, 10 g/l to 200 g/l of at least one compound forming a dense cathode film, selected from ammonium molybdate, alkali molybdate, alkaline-earth molybdate, ammonium vanadate, alkali vanadate, alkaline-earth vanadate, ammonium zirconate, alkali zirconate and alkaline-earth zirconate, can be contained in the electrolyte as additional component. $Li^+$, $Na^+$ and $K^+$ can be used as alkali ions. Examples of alkaline-earth ions are $Mg^{2+}$ and $Ca^{2+}$. The named component forms a dense cathode film during electrolytic deposition, as described in WO 2004/050960. In a particularly preferred embodiment the component is $(NH_4)_6Mo_7O_{24}.4H_2O$, which is particularly favorable for the formation of the structured chromium solids particles layer.

If a chromium solids particles layer not alloyed with molybdenum, vanadium or zirconium is to be produced, the electrolyte preferably does not contain any of the above-named compounds forming a dense cathode film. In a further preferred embodiment the electrolyte does not thus contain a compound selected from ammonium molybdate, alkali molybdate, alkaline-earth molybdate, ammonium vanadate, alkali vanadate, alkaline-earth vanadate, ammonium zirconate, alkali zirconate and alkaline-earth zirconate.

If the structured chromium solids particles layer consists of at least two layers, the individual layers may have alloy constituents at different levels or completely different constituents. This can be suitably chosen depending on the requirements to be met by the layer or the machine element to be coated.

If the structured chromium solids particles layer is formed such that the at least two chromium-layer have a different crystal structure, the intrinsic strength of the layer can be further improved. The chromium is deposited from the electrolyte at the cathodically connected machine element to produce at least one layer of hard chromium, with the result that several strata of hard chromium with a different crystallization form are deposited in the chromium layer corresponding to the current density. After depositing each phase of a layer, the machine element is anodically connected with the result that the network of cracks in the hard chromium widens and is filled with the solids particles. The layers of varying crystal structure are deposited preferably alternately one above the other.

The present invention also relates to a structured chromium solids particles layer obtainable according to the above-described method.

The structured chromium solids particles layer has a network of cracks in which solids particles are embedded in the cracks, the crack density is 10-250/mm, the particle size of the solids particles is in the range of from 0.01-10 µm, the proportion of solids particles in the overall layer is 1-30 vol.-% and the chromium solids particles layer has depressions in the surface of the layer, wherein the proportion of the surface area accounted for by the depressions is 5-80%.

By a microstructure is meant within the meaning of the present invention a microscopic structure which lies in the µm range. The surface comprises projecting areas (load-bearing portion of the surface) and recessed areas (depressions, troughs). Unlike other structures known from the prior art, which have a spherical structure with spheres passing into one another, the structure of the layer according to the present invention can be paraphrased as a structure with insular depressions. The depressions are preferably designed cup-shaped and/or labyrinthine and/or columnar. This microstructure has proved particularly wear-, scorch- and corrosion-resistant and shows an outstanding lubricant-retention capacity of the surface, from which outstanding sliding and emergency running properties result. The lubricant-retention capacity of the surface is essentially caused by the particular microstructure in the depressions of which some lubricant is fixed, and not by the network of cracks of the layer, as the cracks can be sealed in the course of the method and thus can absorb no, or only insignificant quantities of, lubricant.

In order to achieve a high wear- and scorch resistance of the layer, a proportion of solids particles in the chromium solids particles layer is 1 to 30 vol.-% (percent by volume). Preferably, the proportion of solids particles in the chromium solids particles layer is 1-20 vol.-%, particularly preferably 2 to 10 vol.-%, relative to the volume of the whole chromium solids particles layer.

An advantageous distribution of the solids particles is achieved in the layer if the crack density is 10-250/mm. The crack density is the number of cracks cut on average by a 1 mm line. Crack densities of 30-200/mm are particularly preferred and crack densities of 50-100/mm are most preferred. The network of cracks preferably extends through the whole chromium solids particles layer according to the invention.

Figure 2:
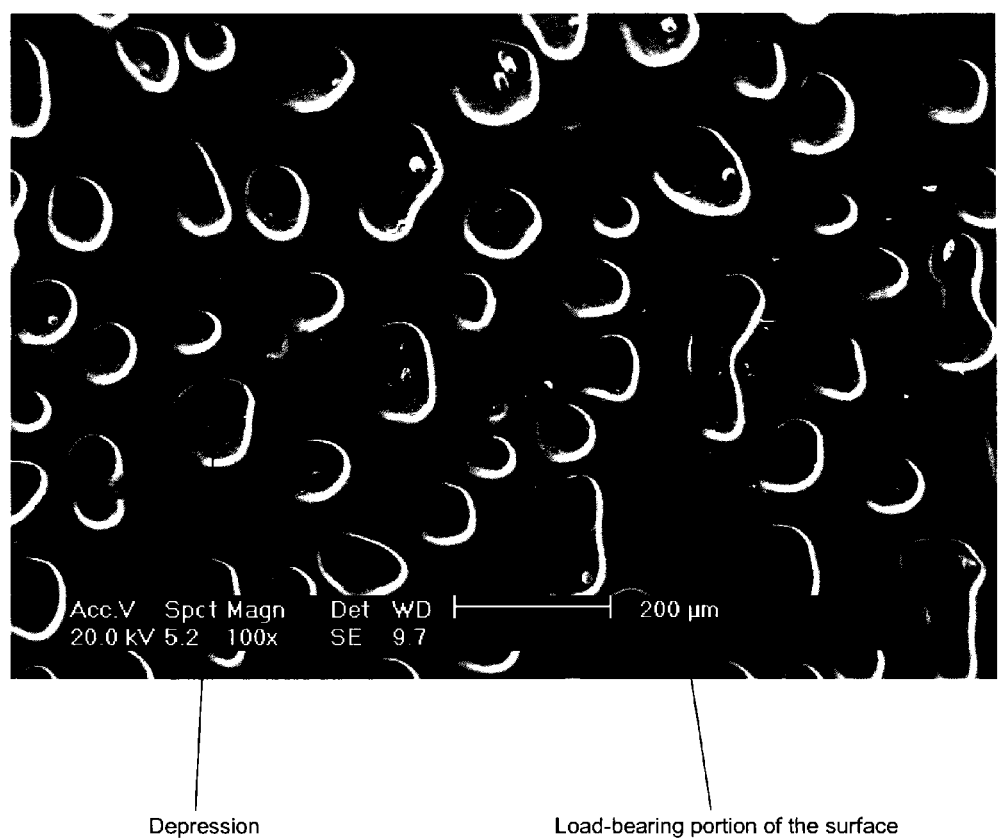
Figure 3:
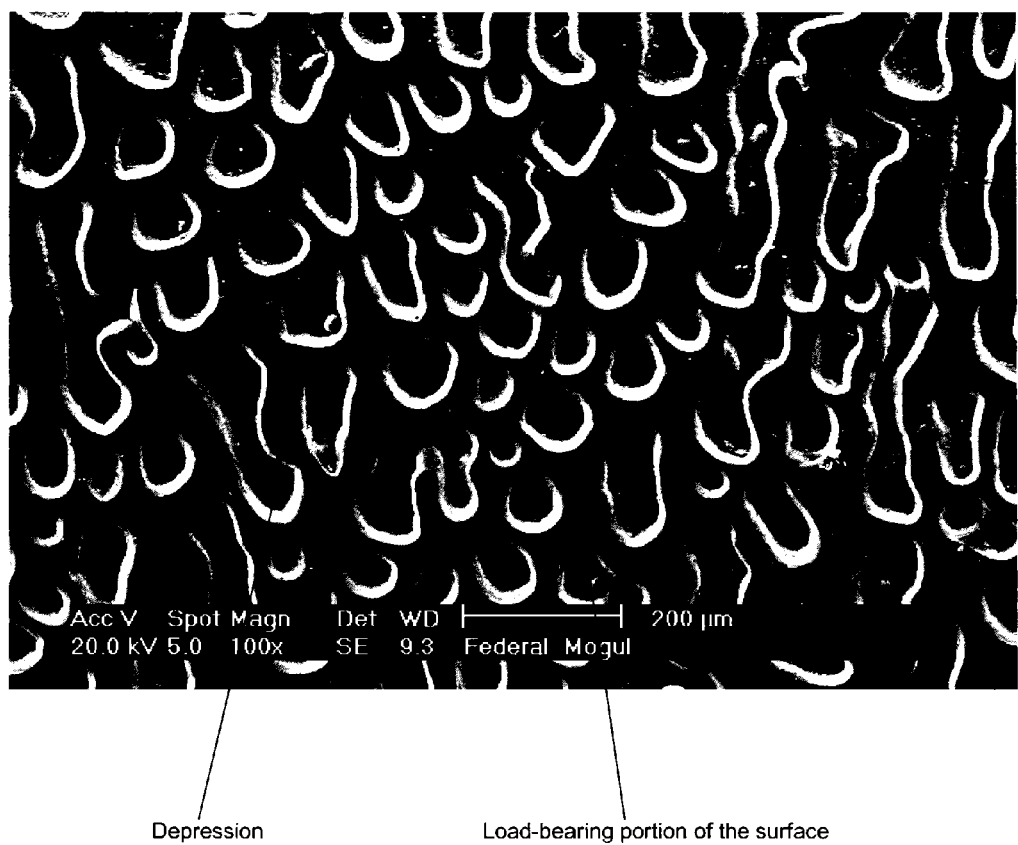
Figure 4:
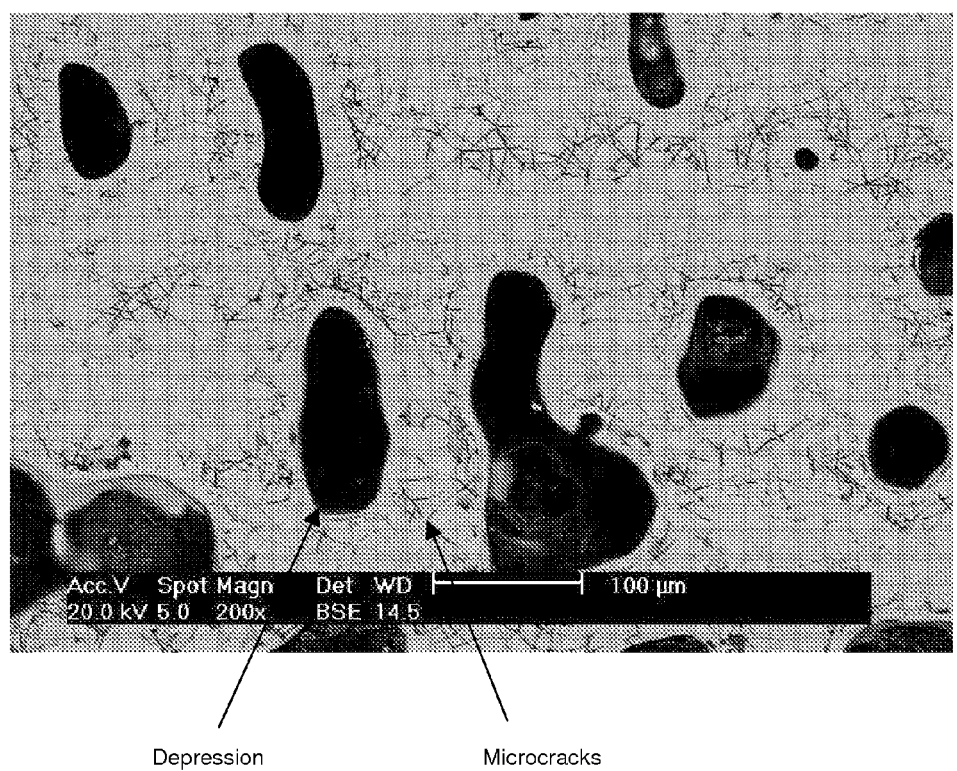
FIGS. 4 and 5 show scanning electron microscopy slide photographs of structured chromium solids particles layers according to the invention, in which the surfaces of the structured chromium solids particles layers were polished in order to make the network of cracks in the layers visible.
Figure 5:
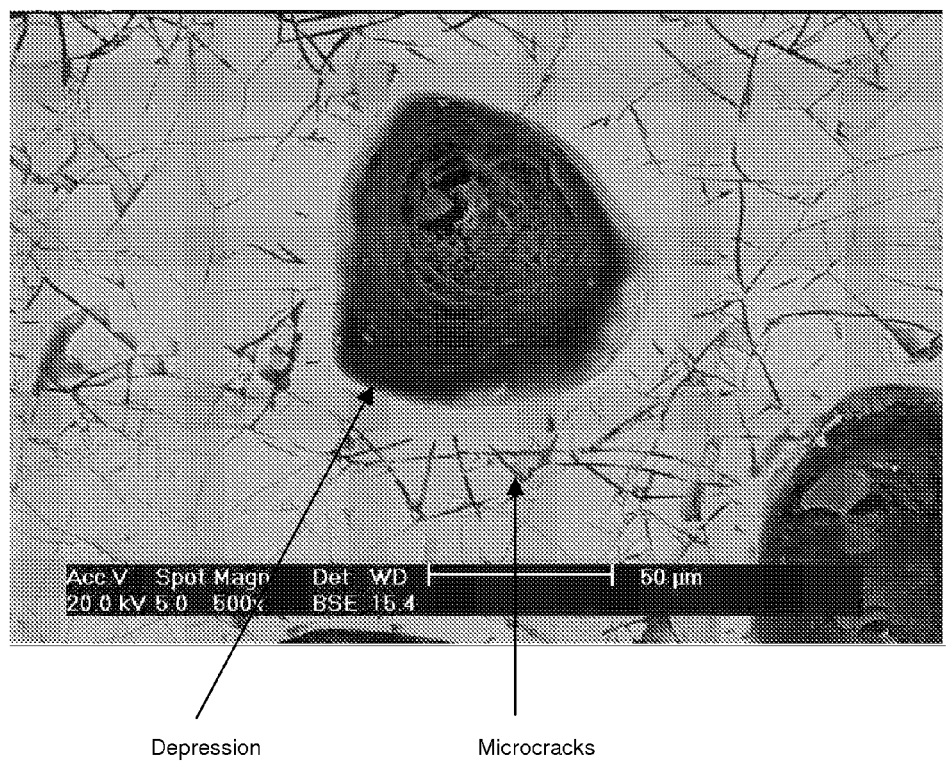

The proportion of the surface area accounted for by the depressions is 5-80%. The proportion of the surface area accounted for by the depressions is ascertained in a top view looking onto the surface of the layer as shown in FIGS. 1-3 by determining the proportion of the surface which consists of depressions, relative to the total surface area. Microstructures in which the proportion of the surface area accounted for by the depressions is 10-70%, in particular 15-60%, have proved particularly favorable. An increased proportion of the surface area accounted for by the depressions can result from a larger number of individual depressions per surface unit of the surface area or from individual depressions occupying more space or depressions combining. Labyrinthine structures result from depressions joining together, as can be seen in FIG. 1. The total surface area is the sum of the surface area of the depressions and the surface area of the bearing area (load-bearing portion of the surface). The load-bearing portion of the surface is accordingly 20-95%, preferably 30-90% and particularly preferably 40-85%.

The chromium solids particles layer has structures in the microrange. It has proved advantageous if the layer has an average of 3 to 100 depressions with a maximum extension of more than 30 µm per square millimeter ($mm^2$) of the surface area. The maximum extension of a depression is the maximum size of a depression, measured from edge to edge of a depression, wherein the edge of a depression is the transition from the projecting area to the recessed area (depression).

This transition can be seen in the bright coloring in FIGS. 1-3. For example, a depression 10 µm wide and 40 µm long would fall under the above definition of depressions with a maximum extension of more than 30 µm, while a depression 20 µm wide and 20 µm long would not fall under this definition. With labyrinthine structures, such as are shown in FIG. 3, the maximum extension is measured over a straight line from one end to the other end of the labyrinthine depression.

Preferably, the average number of depressions with a maximum extension of more than 30 µm is 5-90/mm$^2$ surface area, particularly preferably 8-80/mm$^2$ surface area and most preferably 12-60/mm$^2$ surface area. Furthermore, it is preferred that the proportion of the surface area accounted for by the depressions with a maximum extension of more than 30 µm is 5-80%, relative to the total surface area of the structured chromium solids particles layer. The proportion of the surface area accounted for by the depressions with a maximum extension of more than 30 µm is particularly preferably 10-70%, in particular 15-60%. The depressions with a maximum extension of more than 30 µm are preferably more than 3 µm, particularly preferably more than 5 µm and most preferably more than 10 µm deep.

In a preferred embodiment the average minimum distance between adjacent depressions is 10-150 µm. By average minimum distance between adjacent depressions is meant the average of the smallest distance between adjacent depressions. The distance is the section from the edge of one depression to the edge of the next depression.

The network of cracks of the layer consists of microcracks whereby within the meaning of the present invention microscopic cracks in the nm to µm range are meant, in particular cracks of which the gap width lies in the range of from approximately 0.01-20 µm.

A proportion of the surface area of the cracks can also be ascertained by electrolytic or chemical etching of the layer. However, as the proportion of the surface area depends on the intensity and duration of the etching process, the proportion of the surface area of the cracks can vary within a wide range and is as a rule 2-30%.

Furthermore, with the structured chromium solids particles layer, the suitable, preferred, and particularly preferred versions described above in connection with the method according to the present invention are likewise suitable, preferred, and particularly preferred.

The present invention also relates to a coated machine element, in particular a piston ring, with a surface comprising a structured chromium solids particles layer applied to the surface. With the coated machine element, the above-described suitable, preferred and particularly preferred versions of the invention are likewise suitable, preferred and particularly preferred. The coated machine element has the advantages described above in connection with the structured chromium solids particles layer.

The structured chromium solids particles layer of the present invention can be applied directly to a machine element or to one or more layers which were previously applied to the machine element.

By a layer applied "to" a surface or a layer is meant within the meaning of the invention both a layer applied directly to the surface or the layer and also a layer applied to an interim layer. A layer C applied "to" a layer A is thus present with a layer structure A, C and with a layer structure A, B, C, wherein B is the intermediate layer and A the layer facing the machine element.

For example, a customary chromium layer, a structured hard chromium layer (without solids particle) or a non-structured chromium solids particles layer can be found beneath the structured chromium solids particles layer according to the present invention. A structured hard chromium layer described for example in WO 2004/050960 A1 or WO 2005/108648 A2 can be applied as structured chromium solids particles layer and a layer described in EP 0217126 A1 or WO 2001/004386 A1 as non-structured chromium solids layer.

One or more layers can be applied onto the structured chromium solids particles layer according to the present invention. The above-described layers also come into consideration for this, in particular a particle-free structured hard chromium layer and a non-structured chromium solids particles layer.

A running-in layer which makes the running-in of the machine element easier can be applied to the structured chromium solids particles layer according to the present invention. This is preferable in particular when using the layer on piston rings, because thus the running-in phase of the piston rings can be shortened and the oil consumption and emissions during running-in of the engine reduced.

Particularly preferred running-in layers are PVD and CVD layers.

By a PVD layer is meant a layer deposited by PVD (physical vapor deposition) on a machine element. PVD methods are known per se to a person skilled in the art. The basic layer material is evaporated by laser, ion or electron beams or by arc discharge, mostly under reduced pressure, at approximately 1-1000 Pa, vaporized, and the PVD layer formed by condensation of the material vapor on the substrate. If necessary a suitable process gas can also be applied.

By a CVD layer is meant a layer deposited on a machine element by CVD (chemical vapor deposition). CVD methods are known per se to a person skilled in the art. With a CVD method a solid from the gas phase is deposited on the heated surface of a substrate by a chemical reaction. As a rule, CVD methods are also carried out under reduced pressure, at approximately 1-1000 Pa.

According to the present invention, all coatings obtainable by PVD or CVD methods are suitable as PVD or CVD layers. Preferred PVD or CVD layers are DLC (diamond-like carbon) layers. These are layers of amorphous carbon which can be deposited by PVD or CVD methods from a carbon-containing gas. These can be deposited in particular by PVD or PECVD (plasma-enhanced chemical vapor deposition) methods. More preferably, PVD or CVD layers comprise titanium nitride compounds or chromium nitride compounds, in particular titanium nitrides of the formula $TiN_x$, titanium nitride compounds of the formula $TiN_xA_y$, chromium nitrides of the formula $CrN_x$ and chromium nitride compounds of the formula $CrN_xA_y$, in which A stands for carbon (C), boron (B), oxygen (O) and/or hard material-forming elements such as for example silicon (Si), vanadium (V), niobium (Nb), tungsten (W), aluminium (Al), tantalum (Ta), zirconium (Zr) etc. and x and y, independently of one another, are 0.1 to 1.5. Preferably, x and y, independently of one another, are 0.3-1.2, particularly preferably 0.5 to 1. For example, titanium nitride ($TiN_x$), titanium carbonitride ($TiC_yN_x$), titanium oxide nitride ($TiO_yN_x$), titanium aluminium nitride ($TiAl_yN_x$), chromium nitride ($CrN_x$), chromium carbonitride ($CrC_yN_x$), chromium oxide nitride ($CrO_yN_x$), chromium aluminium nitride ($CrAl_yN_x$) or also multi-element compounds such as for example chromium aluminium silicon nitrides, chromium aluminium zirconium nitrides or chromium aluminium silicon zirconium nitrides, can be used, in particular those of formulae $CrAl_aSi_bN_x$, $CrAl_aZr_bN_x$ or $CrAl_aSi_bZr_cN_x$, in which a, b, c and x, independently of one another, are 0.1 to 1.5, preferably 0.1-1.2, particularly preferably 0.2-1. In the multi-layer arrangement, chromium nitride compounds, which can contain the above further elements, are particularly preferably used as PVD or CVD layer. The PVD or CVD layer particularly preferably consists of the above-named compounds.

The layer thickness of the PVD or CVD layer is preferably 5-80 μm, particularly preferably 5-60 μm, yet more preferably 5-40 μm and most preferably 10-30 μm. As the PVD or CVD layer is applied to a structured layer, also meant by a PVD or CVD layer, is a deposited PVD or CVD material which completely or partially fills the depressions of the structured layer lying below and in the process completely or only partially covers the structured layer lying above or merely completely or partially fills the depressions of the structured layer lying below without forming a continuous layer within the meaning of a complete covering. The layer thickness is, in the last-named case, the mean value from the fill level of the depressions.

A coating of at least two layers which comprises the structured chromium solids particles layer and a running-in layer on top of that is particularly preferred.

After the running-in of such two-layer coating, the surface is formed from the elevations of the structured chromium solids particles layer and the solids particles as well as the running-in layer remaining in the depressions of the structure, and thus particularly advantageous properties of the then run-in layer achieved.

It is understood that the features named above and to be further explained below can be used not only in the given combinations but also in other combinations or alone, without exceeding the scope of the present invention.

The following examples further illustrate embodiments of the present invention.

EXAMPLE 1

A chromium electrolyte of the following basic composition is produced:

| | |
|---|---|
| Chromic anhydride | 200 g/l |
| Sulphuric acid | 3.0 g/l |
| Methanesulphonic acid | 9.5 g/l |
| Diamond particles | 50 g/l (polycrystalline, size from 0.25-0.45 μm) |

A piston ring is dipped into the electrolyte after customary pre-treatment and subjected to the following current program at 70° C.:

| Step 1 | 1 min | 100 A/dm$^2$ | (cathodic connection) |
|---|---|---|---|
| Step 2 | 20 min | 70 A/dm$^2$ | (cathodic connection) |
| Step 3 | 1 min | 60 A/dm$^2$ | (anodic connection) |
| Step 4 | 5 min | 100 A/dm$^2$ | (cathodic connection) |

The current yield is 11% in steps 1 and 4 and 9.5% in step 2. The Cr(III) content corresponds to 10 g/l $Cr_2O_3$. Steps 2 and 3 are repeated five times.

EXAMPLE 2

A chromium electrolyte of the following basic composition is produced:

| | |
|---|---|
| Chromic anhydride | 300 g/l |
| Sulphuric acid | 6.0 g/l |
| Methanesulphonic acid | 14 g/l |
| Diamond particles | 50 g/l (polycrystalline, size from 0.25-0.45 μm) |

After customary pre-treatment piston rings are dipped into the electrolyte and subjected to the following current program at 70° C.:

| Step 1 | 40 min | 40 A/dm$^2$ | (cathodic connection) |
|---|---|---|---|
| Step 2 | 3 min | 15 A/dm$^2$ | (anodic connection) |
| Step 3 | 40 min | 40 A/dm$^2$ | (cathodic connection) |

The current yield in steps 1 and 3 is 8%. The Cr(III) content corresponds to 9 g/l $Cr_2O_3$. Steps 1 and 2 are repeated five times.

COMPARISON EXAMPLE 1

Production of a structured hard chromium layer according to WO 2004/050960 A1.

A chromium electrolyte of the following composition is produced:

| | |
|---|---|
| Chromic anhydride $CrO_3$ | 250 g/l |
| Sulphuric acid $H_2SO_4$ | 2.5 g/l |
| Methanesulphonic acid | 4 g/l |
| $(NH_4)_6Mo_7O_{24} \cdot 4H_2O$ | 100 g/l. |

A piston ring is introduced after customary pre-treatment into the electrolyte and coated at 55° C. with 40 A/dm$^2$ for 30 min with a cathodic current yield of 8.5%.

The piston ring has a structured chromium layer after the treatment. This chromium layer is glossy on the projecting surface regions (bearing area) and a brown cathode film is located in the depressions of the structure.

COMPARISON EXAMPLE 2

Coating with an unstructured chromium-diamond layer according to WO 2001/004386 A1.

A piston ring is introduced into a crack-forming electrolyte which contains the following constituents:

250 g/l $CrO_3$ chromic acid
1.5 g/l $H_2SO_4$ sulphuric acid
10 g/l $K_2SiF_6$ potassium hexafluorosilicate
50 g/l monocrystalline diamond particles with an average particle size of 0.2 to 0.4 μm are dispersed therein by stirring and kept suspended during chromium plating. Chromium plating takes place at a temperature of 60° C. Firstly, the piston ring to be chromium-plated is cathodically connected in a first stage and chromium-plated at a current density of 65 A/dm$^3$ and a current yield of 23% over 8 minutes. In a second stage, polarity is reversed and the network of cracks of the previously-deposited chromium layer widened by anodic connection of the machine element at a current density of 60 A/dm$^3$ over a minute and filled with diamond particles. This cycle, namely 8 min cathodic chromium plating and 1 min anodic etching, is repeated five times in total.

COMPARISON EXAMPLE 3

Structured hard chromium layer with chromium diamond particles layer arranged above According to the above procedure according to comparison example 1, a piston ring is firstly provided with a structured hard chromium layer and then, according to the above procedure according to comparison example 2, with an unstructured chromium-diamond particles layer. The chromium-diamond particles layer partly assumes the structure of the hard chromium layer lying below.

The scorch resistance, the wear resistance and the sliding properties of the correspondingly coated piston rings were then determined. For this, the piston rings were then left to run at full load under motor conditions on a motor test bench for 1000 hours in a 6-cylinder turbo diesel engine. The scorch- and wear resistance were determined with the help of simulation test machines (scorch-mark tester and wear tester both from Plint). The sliding properties were evaluated with reference to the topology of the surface of the coated piston ring. In the Table, ++ means very good, + good and 0 average.

TABLE

Scorch resistance, wear resistance and sliding properties of coated piston rings

| Coating | Scorch resistance | Wear resistance | Sliding properties |
|---|---|---|---|
| Structured hard chromium layer (comparison example 1) | 50% | 25% | ++ |
| Unstructured chromium diamond particles layer (comparison example 2) | 75% | 100% | 0 |
| Structured hard chromium layer + chromium diamond particles layer (comparison example 3) | 75% | 100% | + |
| Structured chromium diamond particles layer (Example 1) | 100% | 100% | ++ |

As can be seen in the above Table, the structured chromium diamond particles layer according to example 1 of the present invention displays the outstandingly low wear, i.e. the very good wear resistance, of a chromium diamond particles layer, and also shows outstanding scorch resistance and the very good sliding properties of a structured hard chromium layer.

The above disclosure is intended to be illustrative and not exhaustive. This description will suggest many variations and alternatives to one of ordinary skill in this art without departing from the scope of the present invention. All these alternatives and variations are intended to be included within the scope of the attached claims. Those familiar with the art may recognize other equivalents to the specific embodiments described herein which equivalents are also intended to be encompassed by the claims attached hereto.

The invention claimed is:

1. A structured chromium solids particles layer comprising:
    a plurality of solids particles embedded within a network of cracks,
    wherein the network of cracks has a crack density of 10-250 /mm, the solids particles have a particle size in the range of 0.01-10 µm, a proportion of the solids particles in the structured chromium solids particles layer is 1-30 vol.-%, the structured chromium solids particles layer has a microstructure with a plurality of depressions in the surface of the layer, and the depressions account for a depression proportion of 5-80% of a total surface area;
    wherein the structured chromium solids particles layer has an average of 3 to 100 depressions with a maximum extension of more than 30 µm per square millimeter of the total surface area and are more than 3 µm deep.

2. The structured chromium solids particles layer of claim 1, wherein the depressions with the maximum extension of more than 30 µm account for the depression proportion of the surface area of 5-80% relative to the total surface area and are more than 5 µm deep.

3. The structured chromium solids particles layer of claim 1, wherein the depressions with the maximum extension of more than 30 µm account for the depression proportion of the surface areas 5-80% relative to the total surface area and are more than 10 µm deep.

4. The structured chromium solids particles layer of claim 1, wherein the solids particles are hard material particles with a Mohs' hardness of 9 or higher.

5. The structured chromium solids particles layer of claim 1, wherein the solids particles are diamond particles with a size from 0.25-0.45 µm.

6. The structured chromium solids particles layer of claim 1, wherein the microstructure of the surface is cup-shaped, labyrinthine, columnar, or a combination thereof.

7. A method for the production of a structured chromium solids particles layer of claim 1, comprising the steps of:
    (a) introducing a machine element into an electrolyte comprising:
        a Cr(VI) compound in an amount corresponding to 100 g/l to 400 g/l of chromic anhydride,
        1 g/l to 8 g/l of sulphuric acid,
        5 g/l to 18 g/l og aliphatic sulphonic acid comprising 1 to 6 carbon atoms,
        solids particles with a size from 0.01 µm to 10 µm, and
        less than 0.5 g/l of inorganic fluoride compounds;
    (b) electrolytically depositing a chromium-containing layer on the machine element at a current density of 20-100 A/dm$^2$ and a current yield of 12% or less; then
    (c) reversing the current direction, wherein the solids particles embed themselves in microcracks of the layer; and
    (d) optionally repeating steps (b) and (c).

8. The method of claim 7, further comprising repeating step (b) after step (c).

9. The method of claim 7, wherein the electrolyte further comprises Cr(III) in a quantity corresponding to 4-16 g/l $Cr_2O_3$.

10. The structured chromium solids particles layer of claim 1, provided on a machine element.

11. The structured chromium solids particles layer of claim 10, wherein the machine element is a piston ring and the structured chromium solids particles layer is coated on the piston ring.

12. The coated piston ring of claim 11, further comprising at least one layer arranged below the structured chromium solids particles layer.

13. The coated piston ring of claim 12, further comprising at least one layer arranged above the structured chromium solids particles layer.

14. The coated piston ring of claim 11, further comprising at least one layer arranged above the structured chromium solids particles layer.

15. The structured chromium solids particles layer of claim 3, wherein the depressions are more than 5 µm deep.

16. The structured chromium solids particles layer of claim 15, wherein the solids particles have a Mohs' hardness of 9 or more.

17. The method of claim 8, wherein the electrolyte further comprises Cr(III) in a quantity corresponding to 4-16 g/l $Cr_2O_3$.

18. A method for the production of a structured chromium solids particles layer of claim 1 on a workpiece, comprising the steps of:
   (a) providing a workpiece;
   (b) introducing the workpiece into an electrolytic solution comprising:
      a Cr(VI) compound in the form of chromic anhydride in an amount of 100 g/l-400 g/l, sulphuric acid in an amount of 1-8 g/l, aliphatic sulphonic acid having 1-6 carbon atoms in an amount of 5-18 g/l, a plurality of solid particles having a size of 0.01-10 μm, and an inorganic fluoride compound in an amount less than 0.5 g/l;
   (c) electrolytically depositing a chromium-containing layer on the workpiece, wherein the chromium-containing layer is electrolytically deposited at a current density of 20-100 A/dm$^2$ and a current yield of 12% or less; and
   (d) reversing the current direction, wherein the solids particles embed themselves in one or more microcracks of the layer.

19. The method of claim 18, further comprising repeating step (b) after step (c).

20. The method of claim 18, wherein the plurality of solid particles comprises diamond, aluminum oxide, silicon nitride, or combinations thereof.

* * * * *